United States Patent Office 3,378,565
Patented Apr. 16, 1968

3,378,565
SULFAMOYLPYRIDYL PHOSPHOROTHIOATES
AND INTERMEDIATES THEREFOR
Raymond H. Rigterink, Midland, Mich., assignor to The
Dow Chemical Company, Midland, Mich., a corporation of Delaware
No Drawing. Filed Apr. 25, 1966, Ser. No. 544,825
5 Claims. (Cl. 260—294.8)

The present invention is directed to a sulfamoylpyridyl phosphorus compound of the formula

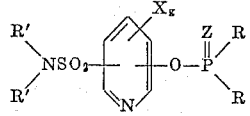

In the above and succeeding formulae, each R independently represents a member selected from the group consisting of loweralkoxy, amino, and loweralkylamino; each R' independently represents a member selected from the group consisting of hydrogen and loweralkyl; X represents halo; Z represents a member selected from the group consisting of oxygen and sulfur; and $g$ represents an integer of from 0 to 1, both inclusive.

In the present specification and claims, the terms "loweralkoxy" and "loweralkyl" are employed to designate alkyl and alkoxy, respectively, radicals being of from 1 to 4, both inclusive, carbon atoms; the term "halo" is employed to designate appearances of bromine and chlorine, only; and the term "loweralkylamino" is employed to designate appearances of both monoloweralkylamino and diloweralkylamino.

The products of the present invention are crystalline solids or viscous liquid materials which are somewhat soluble in many common organic solvents and of very low solubility in water. The compounds are useful as parasiticides and are especially adapted to be employed as active toxicants in compositions for the control, and, in particular, for the selective control, of a number of arachnid, insect, helminth, bacterial and fungal organisms and aquatic animals; such as cockroaches, beetles, mites, ticks, worms, Southern armyworms, aphids, flies, mosquitoes, cattle grubs, screw worms, trash fish, snails, ascarids, nematodes, roundworms and plum curculio.

The products of the present invention are prepared by any of several methods. In a preferred method, the compounds are prepared by reacting a phosphorochloridate or phosphorochloridothioate having the formula

with an alkali metal salt of a sulfamoylpyridinol, which salt has the formula

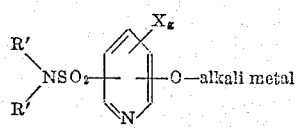

(The term "alkali metal" is employed herein to designate sodium and potassium, only.) The reaction conveniently is carried out in an inert organic liquid such as acetone, dimethylformamide, carbon tetrachloride, chloroform, benzene, toluene, isobutyl methyl ketone, or methylene dichloride. The amounts of the reactants to be employed are not critical, some of the desired product being obtained when employing the reactants in any amounts. In the preferred method of operation, good results are obtained when employing substantially equimolecular proportions of the sulfamoylpyridinol salt and of phosphorochloridate or phosphorochloridothioate. The reaction takes place smoothly at a reaction temperature of from 0° to 100° C., with the production of the desired product and a chloride byproduct which appears as alkali metal chloride. In carrying out the reaction, the reactants are mixed and contacted together in any convenient fashion, and the resulting mixture maintained for a period of time in the reaction temperature range to complete the reaction. Following the completion of the reaction, the reaction mixture is washed with water and any organic reaction medium removed by fractional distillation under reduced pressure to obtain the desired product as a residue. This product can be further purified by conventional procedures such as washing with water and dilute aqueous alkali metal hydroxide, solvent extraction and recrystallization.

In an alternative procedure, the products of the present invention can be prepared by reacting phosphorus oxychloride or phosphorus thiochloride with an alkali metal sulfamoylpyridinol salt as previously defined to form an intermediate sulfamoylpyridyl phosphorodichloridate or phosphorodichloridothioate. Good results are obtained when employing substantially equimolecular proportions of the reactants. The reaction takes place readily at temperatures of from −50° to 80° C. with the production of the desired product and halide of reaction. The intermediate is thereafter reacted with one or two reactants appropriate to the introduction of the desired R moieties. Thus, when one or both R moieties are loweralkoxy, the intermediate is reacted with a compound of the formula loweralkoxy-alkali metal When one or both R moieties are amino or loweralkylamino, the intermediate is reacted with an amine compound of the formula H-amino or loweralkylamino preferably in the presence of a hydrogen chloride acceptor, which can be an excess portion of the same amine compound. When one R moiety is loweralkoxy and the other amino or loweralkylamino, it is preferred that the loweralkoxy group be introduced prior to introduction of the amino or loweralkylamino group. The reaction takes place at temperatures at which chloride of reaction is formed. This chloride appears in the reaction mixture as alkali metal chloride, when a loweralkoxy-alkali metal reactant is employed, or as the hydrochloride salt of the hydrogen chloride acceptor employed when an amine compound reactant is employed. Good results are obtained when operating at temperatures of from −10° to 60° C. and employing substantially stoichiometric amounts of the reactants, or of the reactants and hydrogen chloride acceptor in the instance of an amine compound reactant. Upon completion of the reaction, the desired product is separated by conventional procedures as previously described.

The desirable properties of the present products are inherent in the pure compounds; and when highly selective properties are to be relied upon, the purified products will be preferred. However, for many applications wherein low cost is a major consideration, the reaction mixture wherein the product was prepared can be used with no steps whatsoever of separating or purifying product compounds therefrom, since byproducts of reaction are often unobjectionable. Likewise, incompletely purified products can be used, when desired.

A preferred embodiment according to the present invention constitutes those subject compounds wherein the sulfamoylpyridyl moiety is a radical of the following formula:

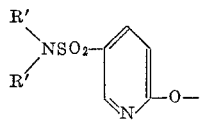

wherein R' is as previously defined.

The following examples illustrate the best mode now known by the inventor for practicing the present invention and will enable those skilled in the art to practice the same.

Example 1.—O-(5-sulfamoyl-2-pyridyl O,O-diethyl phosphorothioate 5-sulfamoyl-2-pyridinol (10.4 grams; 0.06 mole), anhydrous sodium carbonate (6.1 grams; 0.06 mole), and 150 milliliters of dimethylformamide were stirred together at room temperature to produce a liquid medium containing the sodium salt of the 5-sulfamoyl-2-pyridinol. O,O-diethyl phosphorochloridothioate (11.3 grams; 0.06 mole) was added in one portion thereto with stirring. Thereafter, the resulting reaction mixture was heated to a temperature of about 60° C. and maintained at a temperature of 60°–65° C. for 1 hour with stirring to complete the reaction. The reaction mixture was then filtered and the reaction medium removed from the filtrate by distillation under reduced pressure to obtain the O-(5-sulfamoyl-2-pyridyl) O,O-diethyl phosphorothioate product as a residue. The product residue was dispersed in 100 milliliters of benzene and the resulting dispersion washed with two 100-milliliter portions of water. The washed solution was dried over a dehydrating agent, the dried solution filtered, and benzene removed from the filtrate by evaporation under subatmospheric pressure at a temperature of 60° C. to separate the product. The product thus obtained was a liquid material.

Example 2.—O-(5-(dimethylsulfamoyl)-3-chloro-2-pyridyl) O,O-diethyl phosphorothioate In procedures essentially identical with those employed in Example 1, O-(5-(dimethylsulfamoyl)-3-chloro-2-pyridyl) O,O-diethyl phosphorothioate was prepared. The product obtained was a liquid having a refractive index $n_D^{25}$ of 1.5232.

In similar manners, other compounds representative of the present invention are prepared as follows:

From O,O-dimethyl phosphorochloridate and the potassium salt of 2-sulfamoyl-3-pyridinol, O-(2-sulfamoyl-3-pyridyl) O,O-dimethyl phosphate product having a molecular weight of 282.2.

From O-methyl n-butylphosphoramidochloridothioate and the sodium salt of 3-(ethylsulfamoyl)-4-pyridinol, O-(3-(ethylsulfamoyl)-4-pyridyl) O-methyl n-butylphosphoramidothioate product having a molecular weight of 367.4.

From O-ethyl phosphoramidochloridate and the sodium salt of 5-(isopropylmethylsulfamoyl)-2-pyridinol, O-(5-(isopropylmethylsulfamoyl)-2-pyridyl) O-ethyl phosphoramidate product having a molecular weight of 337.4.

From O,O-diethyl phosphorochloridothioate and the sodium salt of 5-(dimethylsulfamoyl)-3-bromo-2-pyridinol, O-(5-(dimethylsulfamoyl)-3-bromo-2-pyridyl) O,O-diethyl phosphorothioate product, a liquid having a refractive index $n_D^{25}$ of 1.5442.

From tetramethylphosphorodiamidochloridothioate and the sodium salt of 2-(diethylsulfamoyl)-3-pyridinol, O-(2-(diethylsulfamoyl)-3-pyridyl) tetramethylphosphorodiamidothioate product having a molecular weight of 380.5.

From O-isobutyl ethylphosphoramidochloridate and the potassium salt of 2-(dimethylsulfamoyl)-5-chloro-3-pyridinol, O-(2-(dimethylsulfamoyl)-5-chloro-3-pyridyl) O-isobutyl ethylphosphoramidate product having a molecular weight of 399.9.

From O,O-di-n-propyl phosphorochloridothioate and the sodium salt of 3-(sec-butylsulfamoyl)-5-bromo-4-pyridinol, O-(3-(sec-butylsulfamoyl)-5-bromo-4-pyridyl) O,O-di-n-propyl phosphorothioate product having a molecular weight of 457.4.

From O,O-diethyl phosphorochloridothioate and the sodium salt of 5-(dimethylsulfamoyl)-2-pyridinol, O-(5-(dimethylsulfamoyl)-2-pyridyl) O,O-diethyl phosphorothioate, a liquid having a refractive index $n_D^{25}$ of 1.5177.

The products of the present invention are useful as parasiticides and parasite repellants in a variety of household, industrial, and agricultural operations. In particular, the products are useful for the kill and control of arthropod pest organisms, such as crustaceans, including sow bugs and fiddler crabs; arachnids, including spiders, mites, and ticks; myriapods, including centipedes; and insects.

The products of the present invention are of special interest because of their effectiveness for the control of the many arthropod organisms found on the roots or aerial portions of growing plants, including aphids, mites, and chewing and sucking insects, such as Southern army worm (*Prodenia eridania*), California red scale (*Aonidiella aurantii*), Mexican bean beetle (*Epilachna varivestis*), two-spotted spider mite (*Tetranychus bimaculatus*), and bean aphid (*Aphis fabae*).

The products of the present invention can also be included in inks, adhesives, soaps, polymeric materials, cutting oils or in oil or latex paints. Also, the products can be distributed in textiles, cellulosic materials, or in grains, or can be employed in the impregnation of wood and lumber. Additionally, they can be applied to seeds. In yet other procedures, the products can be vaporized or sprayed or distributed as aerosols into the air, or onto surfaces in contact with the air. In such applications, the compounds manifest the useful properties hereinbefore described.

The methods of the present invention comprise contacting an arthropod with an inactivating amount of one of the present sulfamoylpyridyl phosphorus products. Contacting can be effected by application of one or more of the products to a habitat of arthropods. Representative habitats include soil, air, water, food, vegetation, inert objects, stored matter such as grains, other animal organisms, and the like. The inactivation can be lethal, immediately, or with delay, or can be a sub-lethal one in which the inactivated arthropod is not able to carry out one or more of its normal life processes. This latter situation prevails when one of the systems of the arthropod, typically the nervous system, is seriously disturbed. A preferred embodiment of the present invention comprises the employment of the present method for the kill and control of insects and arachnids; such employment gives excellent results, particularly in control of insects and arachnids that have developed resistance against other pest-control substances.

The inactivation of an arthropod by the application of an inactivating amount of one of the present products is critical to the method of the present invention. The products can sometimes be employed in unmodified form. Frequently, however, the desirable properties of the products can be utilized only when one or more of the products is composited with one or more pesticidal adjuvant substances, and the resulting compositions are comprehended within the present invention.

The composition can be a liquid or a dust; and the adjuvant employed can be any one or a plurality of materials including aromatic solvents, petroleum distillates, water, or other liquid carriers, propellant substances, surface-active dispersing agents, light absorbers, and finely divided carrier solids. In such compositions, the adjuvant cooperates with the sulfamoylpyridyl phosphorus compound so as to obtain a composition to facilitate the method of the present invention, and to obtain an improved result. The use of either a surface-active dispersing agent or a finely divided carrier solid and the use of both a surface-active dispersing agent and a finely divided carrier solid, simultaneously, constitute preferred embodiments of the method of the present invention. Numerous other embodiments will become available to those skilled in the art in view of the teachings set forth hereinbelow.

The exact concentration of one or more of the products of the present invention in a composition thereof with one or a plurality of adjuvants can vary; it is necessary only that one or more of the products be present in such amount as to make possible the application of an inactivating dosage. In many situations, a composition comprising .0000001 percent of one, or a total of more than one, of the products is effective for the administration of an inactivating amount thereof to arthropod pest organisms. Compositions having a higher concentration of active agent, such as a concentration of from .0000001 to 0.5 percent, can of course be employed. In still other operations, compositions containing from 0.5 to 98 percent by weight of one product, or from 0.5 to 98 percent of a total of more than one product, are conveniently employed. Such compositions are adapted to be employed as treating compositions and applied to parasites and to their habitats, or to be employed as concentrates and subsequently diluted with additional adjuvant to produce ultimate treating compositions.

When combining the present toxicants with adhesives, detergents, cutting oils, paints, polymeric materials, textiles, paper, and other similar products, good results are obtained when the compounds are incorporated in such products in the amount of 0.005 to 0.1 percent by weight, and when heavier applications are needed in the amount of from 0.1 to 2.0 percent by weight. When one or more than one of the present toxicants is combined with wood, excellent results are obtained when the toxicant compound or compounds are incorporated by conventional treatment of the wood in the amount of from 0.00005 to 0.05 pound per cubic foot of wood, depending on depth of penetration, exposure, and the like.

In the preparation of dust compositions, the sulfamoylpyridyl phosphorus product can be compounded with any of the finely divided carrier solids such as pyrophyllite, diatomaceous earth, gypsum and the like. In such operations, the finely divided carrier is ground or mixed with one or more of the sulfamoylpyridyl phosphorus products, as active agent, or wetted with a solution of active agent in a volatile organic solvent. Similarly, dust compositions containing the sulfamoylpyridyl phosphorus products can be similarly compounded from various of the solid dispersing agents, such as fuller's earth, attapulgite and other clays. These dust compositions can be employed as treating compositions or can be employed as concentrates and subsequently diluted with additional solid dispersing agent or with pyrophyllite, diatomaceous earth, gypsum and the like to obtain the desired amount of active agent in a treating composition. Also, such dust compositions can be dispersed in water, with or without the aid of surfactant, to form spray mixtures.

Further, one of the sulfamoylpyridyl phosphorus products or a dust concentrate composition containing such product can be incorporated in intimate mixture with surface active dispersing agents such as ionic and non-ionic emulsifying agents to form spray concentrates. Such concentrates are readily dispersible in liquid carriers to form sprays containing the toxicant in any desired amount. The choice of dispersing agent and amount thereof employed are determined by the ability of the agent to facilitate the dispersion of the concentrate in the liquid carrier to produce the desired spray composition.

In the preparation of liquid compositions, the sulfamoylpyridyl phosphorus product or products can be compounded with a suitable water-immiscible organic liquid and surface active dispersing agent to produce an emulsifiable liquid concentrate which can be further diluted with water and oil to form spray mixtures in the form of oil-in-water emulsions. In such compositions, the carrier comprises an aqueous emulsion, that it, a mixture of water-immiscible solvent, emulsifying and O-(5-(dimethylsulfamoyl)-2-pyridyl) O,O-diethyl phosphorothioate.

Example 4

In further operations, aqueous compositions, each containing one of the present sulfamoylpyridyl phosphorus products, are prepared as follows.

A known quantity of one of the sulfamoylpyridyl phosphorus products is mixed with a quantity of water, a quantity of an alkyl aryl sulfonate (Nacconol NR), and a quantity of a substituted benzoid alkyl sulphonic acid (Daxad 27), and the resulting mixture ballmilled together to produce a composition containing 4000 parts by weight of the sulfamoylpyridyl phosphorus product employed, 300 parts by weight of Nacconol NR and 300 parts by weight of Daxad 27, per million parts of ultimate composition.

In this procedure, there are prepared aqueous compositions from each of the products identified in Example 4. Compositions prepared according to these procedures can be employed as treating compositions or can be diluted with additional quantities of water to prepare aqueous treating compositions of lesser concentrations.

Example 5

An aqueous treating composition containing 50 parts of O-(5-sulfamoyl-2-pyridyl) O,O-diethyl phosphorothioate per million parts by weight of ultimate aqueous treating composition was prepared according to the procedures of Example 3. This aqueous treating composition was employed for the control of Mexican bean beetles, (*Epilachna varivestis*), in the third instar stage, on cranberry bean plants. The cranberry bean plants were wetted briefly with the aqueous treating composition, the wetted plants permitted to dry, and the dried plants placed within a confined area and caused to be infested with a known number of Mexican bean beetles. Thereafter, the infested plants were held under good agricultural conditions for a period of several days. At the end of this period, the cranberry bean plants were examined and it was found that there was obtained a complete kill of the Mexican bean beetles.

Example 6

O-(5-(dimethylsulfamoyl)-2-pyridyl) O,O-diethyl phosphorothioate was evaluated, in the procedures of Example 5, for the control of Mexican bean beetles. A complete kill of beetles was obtained.

Example 7

An aqueous treating composition containing 500 parts of O-(5-(dimethylsulfamoyl)-2-pyridyl) O,O-diethyl phosphorothioate per million parts by weight or ultimate aqueous treating composition was prepared according to the procedures of Example 3. A quantity of fruit and a known number of plum curculio adults feeding thereon were wetted briefly with this aqueous treating composition; thereafter, the treated fruit and curculio adults were permitted to dry and were held for about 6 days under conditions conductive to the growth and well-being of plum curculio. At the end of the 6 day period, the fruit was examined to determine the percent mortality of plum curculio, and it was found that there has been obtained a 100 percent kill and control of plum curculio.

Example 8

Results the same as those reported in Example 7 were obtained when O-(5-(dimethylsulfamoyl)-3-chloro-2-pyridyl) O,O-diethyl phosphorothioate was evaluated in the procedures of Example 7 for the control of plum curculio.

Example 9

An aqueous treating composition containing 50 parts of O-(5-sulfamoyl-2-pyridyl) O,O-diethyl phosphorothioate per million parts by weight of ultimate aqueous treating composition was prepared according to the procedures of Example 3. Houseflies (*Musca domestica*) were uniformly wetted briefly with this aqueous treating composition and thereafter observed for mortality for 72 hours. It was found that treatment of the houseflies in this manner with the subject compound resulted in a 100 percent kill of houseflies.

Example 10

A composition was prepared according to the procedures of Example 3 and containing 100 parts of O-(5-(dimethylsulfamoyl)-3-bromo-2-pyridyl) O,O-diethyl phosphorothioate as sole toxicant per million parts by weight of ultimate treating composition. Cranberry bean plants heavily infested with two-spotted spider mites in the egg and adult stages were wetted briefly with this treating composition, the treated plants permitted to dry, and the treated and dried plants held under favorable agricultural conditions for a period of about 5 days. At the end of this period, the plants were examined to ascertain the percent kill and control of two-spotted spider mites in the adult stage, and to ascertain the percent kill and control of two-spotted spider mites in the egg stage. It was found that there was a 100 percent kill of the two-spotted spider mites in the adult stage, and an essentially complete kill and control of two-spotted spider mites in the egg stage.

The O-loweralkyl phosphoramidochloridates and phosphoramidochloridothioates employed as starting materials in accordance with the teachings of the present application are prepared by reacting two molecular proportions of a suitable amine with one molecular proportion of an O-loweralkyl phosphorodichloridate or phosphorodichloridothioate at a temperature of from −10 to 50° C. Upon completion of the reaction, the desired product is separated by conventional methods.

The phosphorodiamidochloridates and phosphorodiamidochloridothioates to be employed as starting materials are prepared by reacting phosphorus oxychloride or phosphorus thiochloride with a suitable amine in the presence of a hydrogen chloride acceptor to introduce the desird amino or loweralkylamino groups into the molecule. Where it is desired to produce a starting material having different amino and/or loweralkylamino groups, the phosphorus oxychloride orthiochloride is reacted successively with different amines. Good results are obtained when employing stoichiometric amounts of the reactants and of hydrogen chloride acceptor, which can be an excess portion of the amine reactant, and when operating at temperatures at which chloride of reaction is formed.

The O,O-diloweralkyl phosphorochloridates and O,O-diloweralkyl phosphorochloridothioates, employed as starting materials as described herein, are prepared in known procedures by reacting phosphorus oxychloride or phosphorus thiochloride with an alkali metal alcoholate to introduce two alkoxy groups into the molecule. Where it is desired to produce the mixed diester, the phosphorus oxychloride or phosphorus thiochloride is reacted successively with different alcoholates. Good results are obtained when employing stoichiometric amounts of the reagents and operating at temperatures at which chloride of reaction is formed. Following the reaction, the desired products are separated by known procedures.

The alkali metal salts of the sulfamoylpyridinol, which salts are of the formula

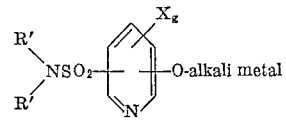

and which are useful to be employed as starting materials in the preparation of the products of the present invention, are prepared in known procedures from the corresponding sulfamoylpyridinol compounds. Thus, the corresponding sulfamoylpyridinol compound is reacted with a base, which can be an alkali metal hydroxide or carbonate. These reactions to prepare the salts are preferably carried out in an inert liquid reaction medium.

The said alkali metal salts are conveniently employed in situ; in such procedures, the desired salt, in the reaction medium in which prepared, is reacted with the phosphorochloridate or phosphorochloridothioate, or phosphorus oxychloride or phosphorus thiochloride, as hereinbefore taught. In other procedures, the products of the present invention are prepared by reacting together the sulfamoylpyridinol compound, the base, and the phosphorochloridate or phosphorochloridothioate, or phosphorus oxychloride or phosphorus thiochloride; in these procedures, the same reaction conditions taught hereinabove for the reaction of the said alkali metal salt are employed.

The sulfamoylpyridinol compounds to be employed as starting materials in preparing the products of the present invention are prepared in known procedures. These procedures are those generally employed in the introduction into a pyridine ring of the requisite —OH, —SO₂N(R')₂, and, optionally, halo (X) moieties. See, in the series The Chemistry of Heterocyclic Compounds, the monograph of Pyridine and Its Derivatives, edited by E. Klingsberg and published by Interscience Publishers, John Wiley & Sons, N.Y., especially chapters VI, XII, and XV. The order of introduction is not critical except that a moiety, once introduced, be unaffected by subsequent reaction(s). However, several synthetic methods have been found to be especially suitable. In one of these, an aminopyridine is sulfonated, such as by reaction with sulfuric acid under known conditions, to obtain the corresponding aminopyridinesulfonic acid. Diazotization of the aminopyridinesulfonic acid yields the hydroxypyridinesulfonic acid, which upon subsequent treatment, successively, with phosphorus pentachloride and with an amine of the formula

results in the desired sulfamoylpyridinol starting material where $g$ represents zero. Where a halogen substituent is present ($g$ represents one), halogenation of the corresponding material yields the desired halo-substituted starting material.

Another preferred synthetic route for the preparation of the sulfamoylpyridinol starting materials comprises the reaction of mono or dihalogenated pyridinol (obtained by halogenation of pyridinol or by halogenation of pyridine followed by subsequent selective hydrolysis) with sodium sulfite, to replace one of the halogen atoms with the —SO₃H group, which is then treated as discussed foregoing to obtain the desired sulfamoyl group.

In a yet other preferred synhtetic route, pyridine is sulfonated, the resulting pyridinesulfonic acid halogenated with one or two halogen atoms, and the resulting halogenated compound hydrolyzed to convert one of the halogen atoms. The resulting compound is then treated, as discussed foregoing, to convert the sulfonic acid to the desired sulfamoyl group.

I claim:
1. Compound of the formula

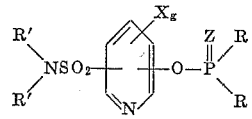

wherein each R independently represents a member selected from the group consisting of loweralkoxy, amino, and loweralkylamino; each R' independently represents a member selected from the group consisting of hydrogen and loweralkyl; X represents halo; Z represents a member selected from the group consisting of oxygen and sulfur; and $g$ represents an integer of from 0 to 1, both inclusive.

2. The compound of claim 1 which is of the formula

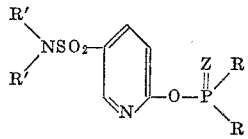

3. The compound of claim 2 which is O-(5-sulfamoyl-2-pyridyl) O,O-diethyl phosphorothioate.
4. The compound of claim 2 which is O-(5-(dimethylsulfamoyl)-2-pyridyl) O,O-diethyl phosphorothioate.
5. Compound of the formula

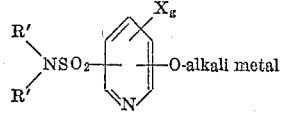

wherein each R' independently represents a member selected from the group consisting of hydrogen and loweralkyl; X represents halo, $g$ represents an integer of from 0 to 1, inclusive; and alkali metal designates a member selected from the group consisting of sodium and potassium.

References Cited
UNITED STATES PATENTS 3,244,586  4/1966  Rigterink _____ 260—294.8

JOHN D. RANDOLPH, *Primary Examiner.*

A. ROTMAN, *Assistant Examiner.*